United States Patent
Wang et al.

(10) Patent No.: US 10,444,405 B2
(45) Date of Patent: Oct. 15, 2019

(54) SYSTEMS AND METHODS FOR CURVATURE ANALYSIS FROM BOREHOLE DIPS AND APPLICATIONS THEREOF

(71) Applicant: Schlumberger Technology Corporation, Sugar land, TX (US)

(72) Inventors: Kang Wang, Beijing (CN); Philippe Marza, Aberdeen (GB); Shiduo Yang, Paris (FR); Randolph Koepsell, Highlands Ranch, CO (US); Mi Zhou, Denver, CO (US); Bin Bin Du, Beijing (CN); Rebecca Steinmann, Abu Dhabi (AE)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 385 days.

(21) Appl. No.: 14/764,160

(22) PCT Filed: Jan. 28, 2014

(86) PCT No.: PCT/US2014/013257
§ 371 (c)(1),
(2) Date: Jul. 28, 2015

(87) PCT Pub. No.: WO2014/117116
PCT Pub. Date: Jul. 31, 2014

(65) Prior Publication Data
US 2016/0003974 A1    Jan. 7, 2016

Related U.S. Application Data

(60) Provisional application No. 61/757,634, filed on Jan. 28, 2013.

(51) Int. Cl.
*G06G 7/48*    (2006.01)
*G01V 99/00*    (2009.01)
(Continued)

(52) U.S. Cl.
CPC ............ *G01V 99/005* (2013.01); *E21B 47/02* (2013.01); *G01V 1/301* (2013.01); *G06F 17/10* (2013.01);
(Continued)

(58) Field of Classification Search
None
See application file for complete search history.

(56) References Cited

U.S. PATENT DOCUMENTS 5,388,044 A * 2/1995 Hepp ..................... E21B 47/026
367/25
5,444,619 A * 8/1995 Hoskins .................. E21B 49/00
382/159

(Continued)

OTHER PUBLICATIONS

C.R. Berg, et al, "PS Using Structural Dip Modeling to Determine Structure and Stratigraphic Position* Search and Discovery Article #40444 (2009)," Poster presentation at AAPG Convention, Denver, Colorado, Jun. 7, 2009, retrieved from the internet at http://www.searchanddiscovery.com/documents/2009/40444berg/ndx_berg.pdf retrieved on Jul. 24, 2015.

(Continued)

*Primary Examiner* — Aniss Chad
*Assistant Examiner* — Nithya J. Moll
(74) *Attorney, Agent, or Firm* — Sara K. M. Hinkley (57) ABSTRACT

Systems and methods for modeling subsurface rock formations based on well log data are provided. Systems include a downhole tool for acquiring data from which borehole dips may be picked and a processor including machine-readable instructions for curvature analysis based on inputs generated from the picked borehole dips data and which may be independent of 2D cross section model orientation. Methods (which may be incorporated in the machine-readable instructions corresponding to the systems) include preprocessing borehole dips data to generate inputs such as true (Continued)

stratigraphic thickness index, Local Constant Dips, borehole structural dip, and attributes for structural dip projections which may be used in a curvature analysis process for generating curvature logs such as standard, curvature along axis and curvature normal to axis logs from for smoothed dips, short zone structural dips and/or long zone structural dips.

17 Claims, 6 Drawing Sheets

(51) Int. Cl.
    *E21B 47/02*     (2006.01)
    *G01V 1/30*     (2006.01)
    *G06F 17/10*     (2006.01)

(52) U.S. Cl.
    CPC .. *G01V 2210/27* (2013.01); *G01V 2210/6169* (2013.01); *G01V 2210/66* (2013.01)

(56) References Cited

U.S. PATENT DOCUMENTS

| | | | |
|---|---|---|---|
| 5,852,588 A * | 12/1998 | de Hoop | G01V 1/28 |
| | | | 367/38 |
| 6,473,696 B1 * | 10/2002 | Onyia | G01V 1/32 |
| | | | 702/14 |
| 8,599,643 B2 * | 12/2013 | Pepper | G01V 1/301 |
| | | | 367/38 |
| 8,793,113 B2 | 7/2014 | Marza et al. | |
| 9,157,318 B2 | 10/2015 | Koepsell et al. | |
| 9,733,387 B2 * | 8/2017 | Huang | G01V 9/00 |
| 2009/0043507 A1 * | 2/2009 | Dommisse | G01V 1/34 |
| | | | 702/6 |
| 2011/0282634 A1 | 11/2011 | Marza et al. | |
| 2012/0090834 A1 | 4/2012 | Imhof et al. | |

OTHER PUBLICATIONS

E.R. Staples, "Subsurface and experimental analyses of fractures and curvature," Thesis submitted to the Graduate Faculty of University of Oklahoma, Dec. 31, 2011, retrieved from the internet at http://geology.ou.edu/aaspi/upload/AASPI_Theses/2011_AASPI_Theses/Evan_Staples_MS2011.pdf retrieved on Jul. 24, 2015.

M.G. Kerzner, et al, "Obtaining Structural and Stratigraphic Dip Information Using egmentation Trees and Optimization," SPE Formation Evaluation, vol. 3, No. 1, Mar. 1, 1988, pp. 47-54.

International search report and written opinion issued in the related PCT application PCT/US2014/013257, dated Oct. 22, 2014 (14 pages).

International preliminary report on patentability issued in the related PCT application PCT/US2014/013257, dated Jul. 28, 2015 (9 pages).

* cited by examiner

SYSTEMS AND METHODS FOR CURVATURE ANALYSIS FROM BOREHOLE DIPS AND APPLICATIONS THEREOF

The present disclosure relates to geological structural modeling of subsurface rock formations based on well log data. The present disclosure also relates to modeling subsurface curvatures from borehole dips data, for example from small scale to large scale independently of 2D cross section model orientation.

BACKGROUND

Oil prices continue to rise in part because the demand for oil continues to grow, while stable sources of oil are becoming scarcer. Oil companies continue to develop new tools for generating data from boreholes with the hope of leveraging such data by converting it into meaningful information that may lead to improved production, reduced costs, and/or streamlined operations.

Borehole imagery is a major component of the wireline business (for example, Schlumberger's FMI™, OBMI™, and Ultrasonic Borehole Imager UBI™ Tools), and an increasing part of the logging while drilling business (for example, Schlumberger's GeoVision™, EcoScope™, and MicroScope™ tools). While borehole imagery provides measurements containing abundant data about the subsurface, it remains a challenge to extract the geological and petrophysical knowledge contained therein.

Knowledge of the curvature of individual subsurface layers may provide useful information to geophysicists. For example, correlation of curvature to fracture density, local tectonic strain or other borehole data may provide useful input in well stimulation design. Curvature analysis may be performed from 2D models of the subsurface, wherein curvature radius of layers may be estimated based on a cross section built from borehole dip information such as obtained from borehole imagery. However, 2D cross sections may have drawbacks such as not being appropriately oriented for capturing the maximum curvature of multiple subsurface structures.

SUMMARY

The present disclosure relates to methods and systems for analyzing raw data from borehole imagery tools, for example systems and methods for modeling subsurface curvatures from borehole dips data, including in some embodiments from small scale to large scale independently of 2D cross section model orientation.

In some embodiments, the methods involve: pre-processing borehole dips data to generate a true stratigraphic thickness ("TST") index, curvature axis orientation information, and one or more upscaled versions of borehole dips; and, estimating a curvature log for dips along a well using the TST index, curvature axis orientation information, and one or more upscaled versions of borehole dips. In further embodiments, the methods also include acquiring borehole dips data using one or more downhole tools. In some embodiments, estimating a curvature log involves computing a local projection for a pair of dips, computing a magnitude of curvature, computing a sign of curvature, and generating a curvature normal to axis, a curvature along axis, and a standard curvature.

In some embodiments, the systems include a downhole tool for generating borehole dips data, and a processor including machine-readable instructions for generating one or more scales of curvature logs from the borehole dips data independently of 2D cross section model orientation. In further embodiments, the machine-readable instructions, when executed result in pre-processing at least a portion of the borehole dips data to generate a TST index, curvature axis orientation information, and one or more upscaled versions of borehole dips, and also result in estimating a curvature log for dips along a well using the generated TST index, curvature axis information, and one or more upscaled versions of borehole dips.

The identified embodiments are exemplary only and are therefore non-limiting. The details of one or more non-limiting embodiments of the invention are set forth in the accompanying drawings and the descriptions below. Other embodiments of the invention should be apparent to those of ordinary skill in the art after consideration of the present disclosure.

BRIEF DESCRIPTION OF DRAWINGS

The curvature logs associated with each input dip set is the curvature normal to the structural axis (maximum curvature).

DETAILED DESCRIPTION

Unless defined otherwise, all technical and scientific terms used herein have the same meaning as is commonly understood by one of ordinary skill in the art to which this disclosure belongs. In the event that there is a plurality of definitions for a term herein, those in this section prevail unless stated otherwise.

Where ever the phrases "for example," "such as," "including" and the like are used herein, the phrase "and without limitation" is understood to follow unless explicitly stated otherwise.

The terms "comprising" and "including" and "involving" (and similarly "comprises" and "includes" and "involves") are used interchangeably and mean the same thing. Specifically, each of the terms is defined consistent with the common United States patent law definition of "comprising" and is therefore interpreted to be an open term meaning "at least the following" and also interpreted not to exclude additional features, limitations, aspects, etc.

"Measurement While Drilling" ("MWD") can refer to devices for measuring downhole conditions including the movement and location of the drilling assembly contemporaneously with the drilling of the well. "Logging While Drilling" ("LWD") can refer to devices concentrating more on the measurement of formation parameters. While distinctions may exist between these terms, they are also often used interchangeably. For purposes of this disclosure MWD and LWD are used interchangeably and have the same meaning. That is, both terms are understood as related to the collection of downhole information generally, to include, for example, both the collection of information relating to the movement and position of the drilling assembly and the collection of formation parameters.

Whenever the phrase "derived from" or "calculated from" or the like are used, "directly or indirectly" are understood to follow. Also, the phrases "estimating from the data" or "calculating from the data" are understood to mean "from the data or subset of the data." By way of example, a borehole image contains an abundance of borehole data, including borehole dips data. In some embodiments, "calculating In Sequence Dips" from borehole dips data extracted from borehole imagery may involve only a subset of the borehole dips data.

Figure 1:
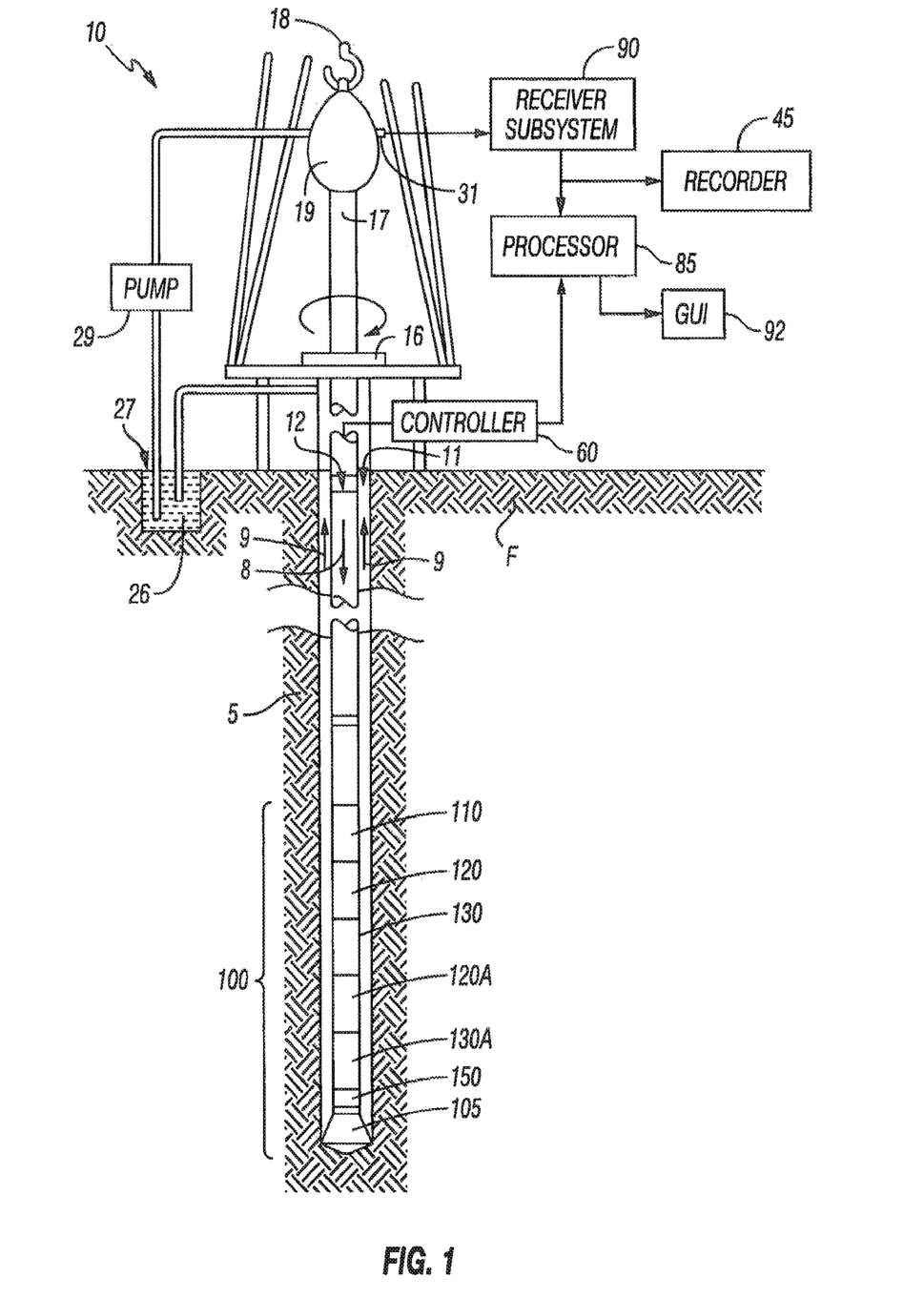
FIG. 1 is a partial schematic representation of an exemplary apparatus for logging while drilling that is compatible with the systems and methods of this disclosure.
Figure 2:
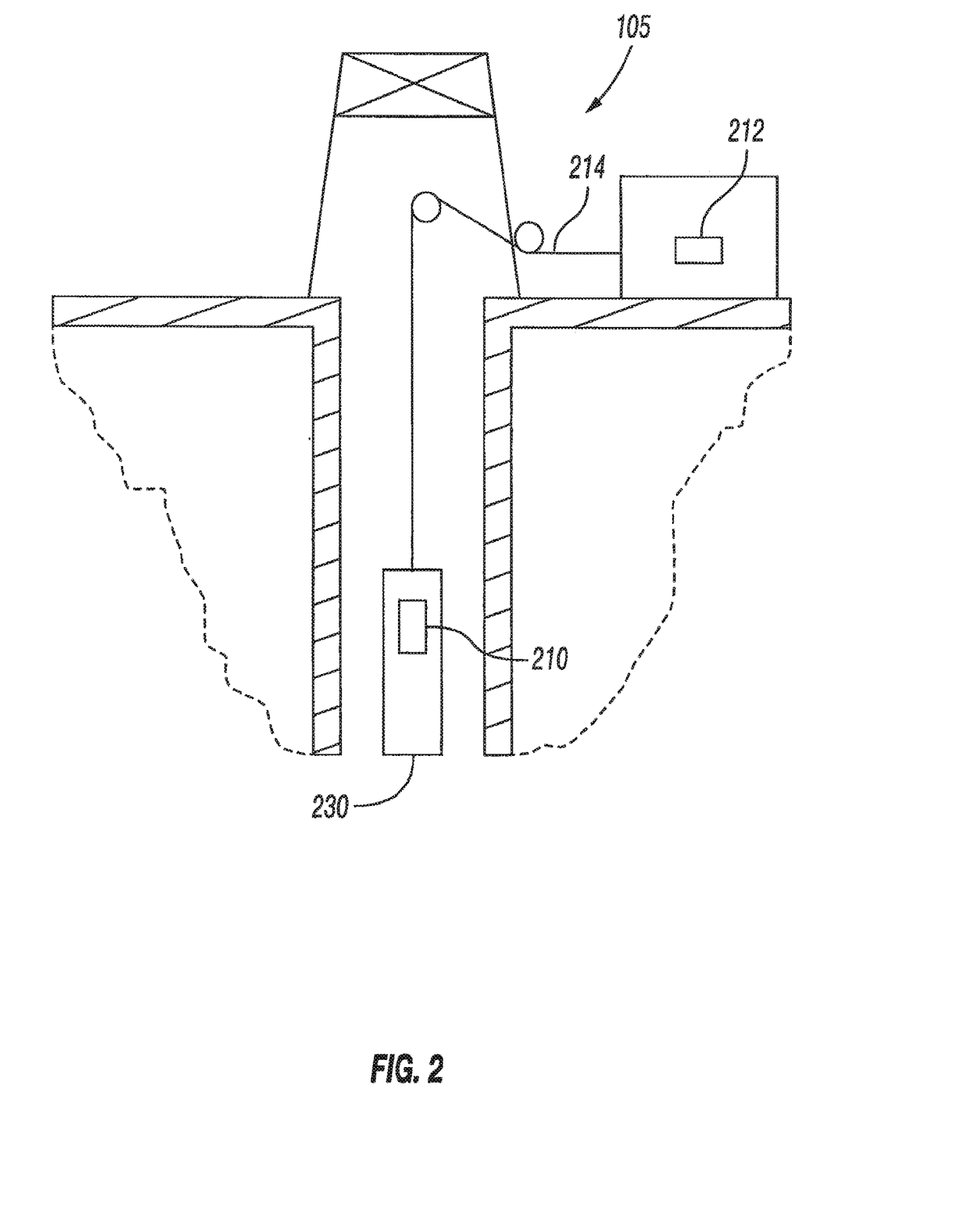
FIG. 2 is a partial schematic representation of an exemplary wireline apparatus that is compatible with the systems and methods of this disclosure.

FIGS. 1 and 2 illustrate non-limiting, exemplary well logging systems used to obtain borehole imagery from which dips in subsurface layers may be picked and used as the basis of modeling the curvature of subsurface layers in accordance with this disclosure.

FIG. 1 illustrates a land-based platform and derrick assembly (drilling rig) 10 and drill string 12 with a well logging data acquisition and logging system, positioned over a wellbore 11 for exploring a formation F. In the illustrated embodiment, the wellbore 11 is formed by rotary drilling in a manner that is known in the art. Those of ordinary skill in the art given the benefit of this disclosure will appreciate, however, that the subject matter of this disclosure also finds application in directional drilling applications as well as rotary drilling, and is not limited to land-based rigs. In addition, although a logging while drilling apparatus is illustrated, the subject matter of this disclosure is also applicable to wireline drilling (for example as shown in FIG. 2).

A drill string 12 is suspended within the wellbore 11 and includes a drill bit 105 at its lower end. The drill string 12 is rotated by a rotary table 16, energized by means not shown, which engages a kelly 17 at the upper end of the drill string. The drill string 12 is suspended from a hook 18, attached to a travelling block (also not shown), through the kelly 17 and a rotary swivel 19 which permits rotation of the drill string 12 relative to the hook 18.

Drilling fluid or mud 26 is stored in a pit 27 formed at the well site. A pump 29 delivers the drilling fluid 26 to the interior of the drill string 12 via a port in the swivel 19, inducing the drilling fluid to flow downwardly through the drill string 12 as indicated by the directional arrow 8. The drilling fluid exits the drill string 12 via ports in the drill bit 105, and then circulates upwardly through the region between the outside of the drill string 12 and the wall of the wellbore, called the annulus, as indicated by the direction arrows 9. In this manner, the drilling fluid lubricates the drill bit 105 and carries formation cuttings up to the surface as it is returned to the pit 27 for recirculation.

The drill string 12 further includes a bottomhole assembly ("BHA"), generally referred to as 100, near the drill bit 105 (for example, within several drill collar lengths from the drill bit). The BHA 100 includes capabilities for measuring, processing, and storing information, as well as communicating with the surface. The BHA 100 thus may include, among other things, one or more logging-while-drilling ("LWD") modules 120, 120A and/or one or more measuring-while-drilling ("MWD") modules 130, 130A. The BHA 100 may also include a roto-steerable system and motor 150.

The LWD and/or MWD modules 120, 120A, 130, 130A can be housed in a special type of drill collar, as is known in the art, and can contain one or more types of logging tools for investigating well drilling conditions or formation properties. The logging tools may provide capabilities for measuring, processing, and storing information, as well as for communication with surface equipment.

The BHA 100 may also include a surface/local communications subassembly 110, which may be configured to enable communication between the tools in the LWD and/or MWD modules 120, 120A, 130, 130A and processors at the earth's surface. For example, the subassembly may include a telemetry system that includes an acoustic transmitter that generates an acoustic signal in the drilling fluid (a.k.a. "mud pulse") that is representative of measured downhole parameters. The acoustic signal is received at the surface by instrumentation that can convert the acoustic signals into electronic signals. For example, the generated acoustic signal may be received at the surface by transducers. The output of the transducers may be coupled to an uphole receiving system 90, which demodulates the transmitted signals. The output of the receiving system 90 may be coupled to a computer processor 85 and a recorder 45. The computer processor 85 may be coupled to a monitor, which employs graphical user interface ("GUI") 92 through which the measured downhole parameters and particular results derived therefrom are graphically or otherwise presented to the user. In some embodiments, the data is acquired real-time and communicated to the back-end portion of the data acquisition and logging system. In some embodiments, the well logging data may be acquired and recorded in the memory in downhole tools for later retrieval.

The LWD and MWD modules 120, 120A, 130, 130A may also include an apparatus for generating electrical power to the downhole system. Such an electrical generator may include, for example, a mud turbine generator powered by the flow of the drilling fluid, but other power and/or battery systems may be employed additionally or alternatively.

The well-site system is also shown to include an electronics subsystem comprising a controller 60 and a processor 85, which may optionally be the same processor used for analyzing logging tool data and which together with the controller 60 can serve multiple functions. For example, the controller 60 and processor 85 may be used to power and operate tools such as tools useful for generating borehole imagery (such as the Schlumberger FMI™, UBI™, OBMI™, MicroScope™, EcoScope™, etc. tools) from which borehole dips may be picked. The controller and processor need not be on the surface as shown but may be configured in any way known in the art. For example, alternatively, or in addition, as is known in the art, the controller and/or processor may be part of the MWD (or LWD) modules on which the FMI™ or other tools are positioned or may be on-board the tool itself In the methods and systems according to this disclosure, the electronics subsystem may include machine-readable instructions for curvature log analysis from borehole dip data collected by the appropriate logging tools.

FIG. 2 illustrates a wireline logging system 205 suitable for use with the systems and methods of this disclosure. As shown in FIG. 2, a transmitter 210 receives the acquired well logging data from a sensor included in the wireline tool 230. The transmitter 210 communicates the acquired well logging data to a surface processer 212 via a logging cable 214. The logging cable 214 is commonly referred to as a wireline cable. In some embodiments, the processor 212 or a back-end portion (not shown) of the wireline logging system may include a computer system to process the acquired well logging data.

Non-limiting examples of logging tools that may be part of the LWD or MWD modules 120, 120A, 130, 130A and may be useful for generating data useful in systems and methods according to embodiments of the present disclosure include the RAB™ resistivity-at-the-Bit tool, the ARC™ Array Resistivity Compensated tool, the PERISCOPE™, the EcoScope™ and Micro Scope™ tools, which are all owned and offered through logging services by Schlumberger, the assignee of the present application. Non-limiting examples of wireline logging tools 230, which may be useful for generating data useful in systems and methods according to the present disclosure include the Formation Microresistivity Imager (FMI™) tool, the UBI™ tool, and the OBMI™ tool, all also owned and offered through logging services by Schlumberger, the assignee of the present application. However, any tool that acquires data from which borehole dips may be picked, for example any tool which may be used to generate borehole images of rock and fluid properties, may be used in the systems and methods according to this disclosure.

Figure 3:
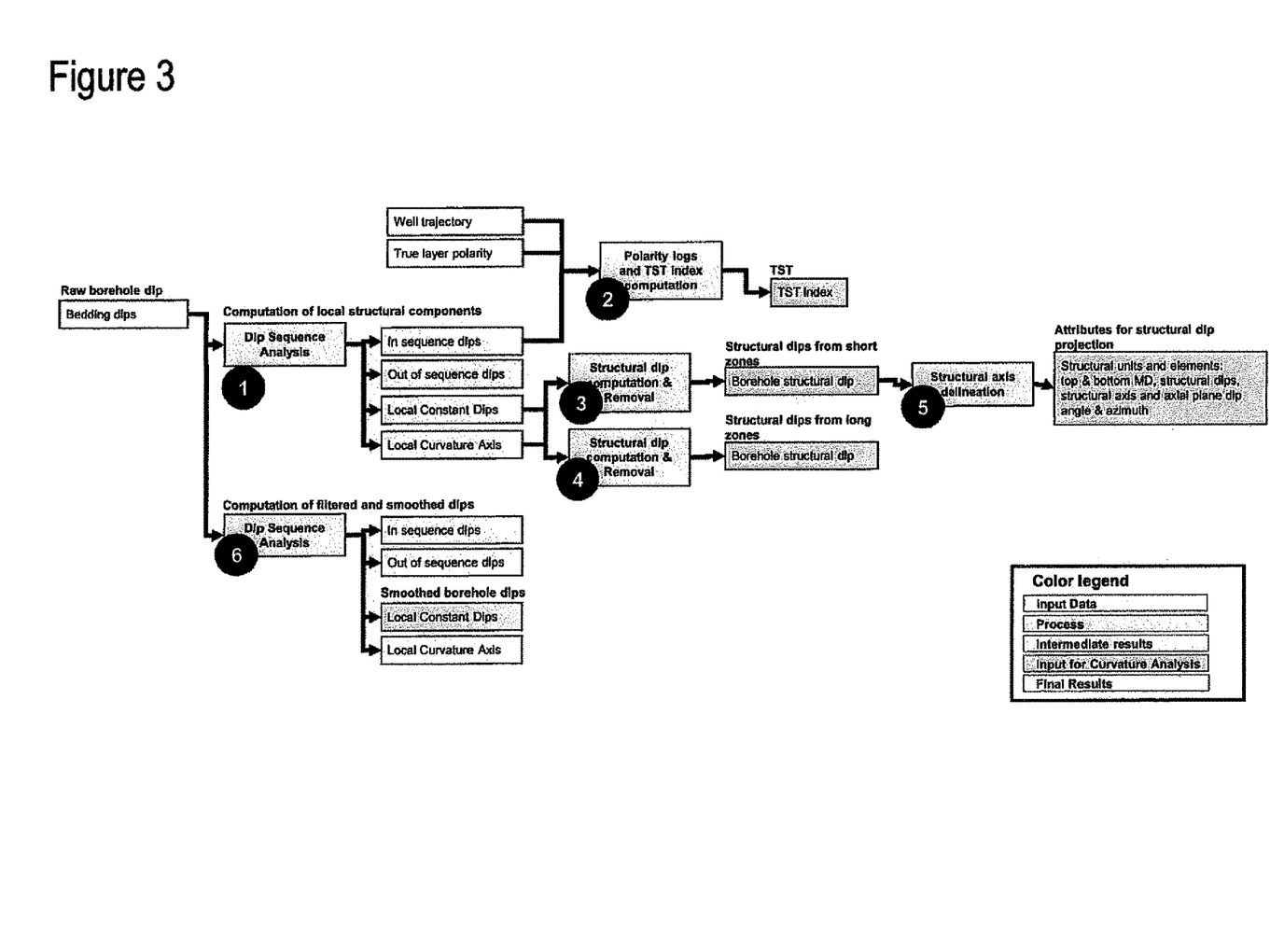
FIG. 3 is a workflow diagram for pre-processing borehole dips data to generate inputs for curvature analysis in accordance with an embodiment of the present disclosure.
Figure 4:
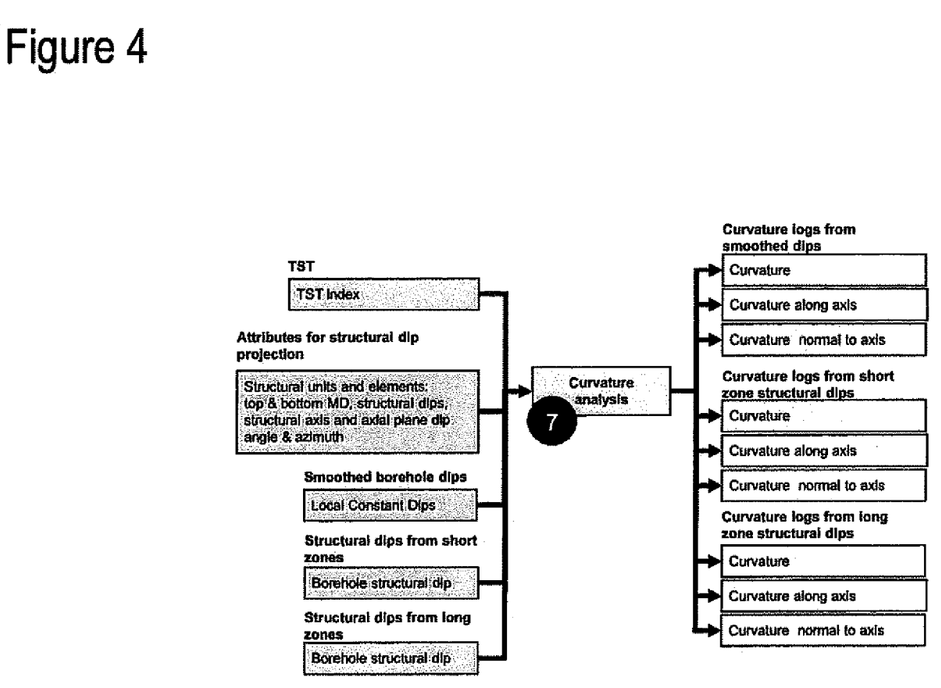
FIG. 4 is workflow diagram of an embodiment of a curvature analysis process according to the present disclosure.

FIGS. 3 and 4 together provide an embodiment of a workflow for a curvature log analysis from borehole dips, which may capture various orders (for example from smaller to larger scales) of curvature present in a borehole dip sequence. In some embodiments, different scales of curvature logs may be generated as a computational result of the workflow. The combined workflow may be implemented on Schlumberger's eXpandBG interpretation software. In some embodiments, the computational results can be used for correlation with formation fracture density, local tectonic strain, or other borehole data to provide useful data for borehole investigation. For example, when a correlation between reservoir curvature and fracture density exists, the information may be used as an input for well stimulation design. In some embodiments, if the thickness and position of a mechanical unit is known, local strain can be calculated with respect to the position and curvature of the unit. In some embodiments, the systems and methods herein are in improvement of this technique for calculating local strain.

In some embodiments, such as that illustrated in FIGS. 3 and 4, the workflow is based on borehole dips and is independent of 2D cross section model orientation. In further or additional embodiments, the workflow provides access to small and large scales of curvature analysis in the maximum and minimum axis of deformation. As a person of skill understands, "small" scale is defined by tool resolution and corresponds to the original resolution of the image generated by the tool. "Large" scale corresponds to any resolution that is greater than the original resolution generated by the tool.

More specifically, in some embodiments, methods according to the present disclosure include steps for pre-processing borehole dips data to generate inputs for the Curvature Analysis process, which process may result in capturing subsurface curvatures from small scale to large scale. In some embodiments, the pre-processing steps result in three inputs: a true stratigraphic thickness (TST) index log of the processed well; orientation of the curvature axis of the drilled geological structure; and, various upscaled versions of the borehole dips depicting the studied geological structure.

FIG. 3 is a workflow diagram of an embodiment of borehole dips data pre-processing steps, which result in the above-mentioned inputs. As illustrated, the workflow comprises six pre-processing steps, which are generally described below and more specifically described in U.S. patent application Ser. Nos. 12/966,716 and 61/334,768, which are both herein incorporated by reference in their entirety.

As illustrated, the pre-processing steps may include:

1. Perform a standard Dip Sequence Analysis, which gives the In Sequence Dips, Local Constant Dips, and Local Curvature Axis.

In Sequence Dips are the dips satisfying the parameters of the dip sequence analysis process. The dips which do not satisfy the parameters of the dip sequence analysis process are the "out of sequence" dips. The three parameters of the dips sequence analysis are: the maximum angle between successive dips of a dip sequence, the minimum number of dips defining a sequence, the maximum distance between successive dips of a sequence.

Local Constant Dip is the average dip of a group of "in sequence dips" satisfying the parameters defining the local constant dip during the local structural component computation. The two parameters of the computation of a local constant dip are: the length of the computation window. The maximum dip dispersion authorized in the computation window.

Local Curvature Axis is the axis of the curvature defined by a group of "in sequence dips" satisfying the parameters defining the local curvature axis during the local structural component computation. The two parameters of the computation of a local curvature axis are: the length of the computation window, and the minimum dip dispersion authorized in the computation window.

2. Use the In Sequence Dips to compute the TST index. The TST index may be used to evaluate the relative position of two successive dips before computing the curvature between them.

3. Use the Local Constant Dips and Local Curvature Axis to perform a Structural Dip Computation, compute it with relatively small structural zones (e.g. around 5 m long zones). The resulting structural dips may serve as a "medium scale" input to the curvature analysis.

4. Perform a second structural dip computation with longer structural zones (e.g. around 50 m long zones). The resulting structural dips may serve as "large scale" input of he curvature analysis.

5. Use the results of the first structural dip computation to perform a Structural Axis Delineation process and compute the structural axis of the dip sequence. The structural axis is the axis of the curvature. Curvature computation in the direction perpendicular to the axis may provide the maximum curvature of the structure. Curvature computation in the direction parallel to the axis may provide the minimum curvature of the structure.

6. Perform a second Dip Sequence Analysis to obtain smoothed Local Constant Dips which may serve as "small scale" input to the curvature analysis.

More specifically, as illustrated in FIG. 3, pre-processing begins with raw borehole dips data acquired by a downhole tool and, for example, picked from borehole imagery generated by the tool. The data is used to compute local structural components such as In Sequence Dips, Out of Sequence Dips, Local Constant Dips and Local Curvature Axis in a first Dip Sequence Analysis (Step 1). The data is also used for computation of filtered and smoothed dips (In Sequence Dips, Out of Sequence Dips, Local Constant Dips, Local Curvature Axis) in a second Dip Sequence Analysis (Step 6). The output of the first Dip Sequence Analysis, specifically the In Sequence Dips, is used to generate the TST index (Step 2). Other of the first Dip Sequence Analysis outputs, specifically Local Constant Dips and Local Curvature Axis are used in one aspect to generate structural dips from short zones (Step 3) and in another aspect to generate structural dips from long zones (Step 4). In step 5, a structural axis delineation process is performed on borehole structural dip information generating attributes for structural dip projection. The attributes may include top and bottom measurement depths, structural dips, structural axis and axial plane dip angle and azimuth, and Structural Plane Dip, which is the result of a computation combining axis and plane dips. In some embodiments, the inputs are local constant dip and local curvature axis computed from bed boundary surfaces whereas the output is the plane dip that best fit the input dips over a defined depth interval. The structural plane dip is the up scaling of the dips observed in the borehole and represents a bigger scale than actually observed, the dip of the structure crossed by the well.

Accordingly, as can be understood from FIG. 3: the first input—the TST index—is generated from steps 1 and 2; the second input—the orientation of the curvature axis—is generated from steps 1, 3 and 5; and, the third input—the various upscaled versions of the borehole dips—is generated from steps 3, 4 and 6.

Figure 5:
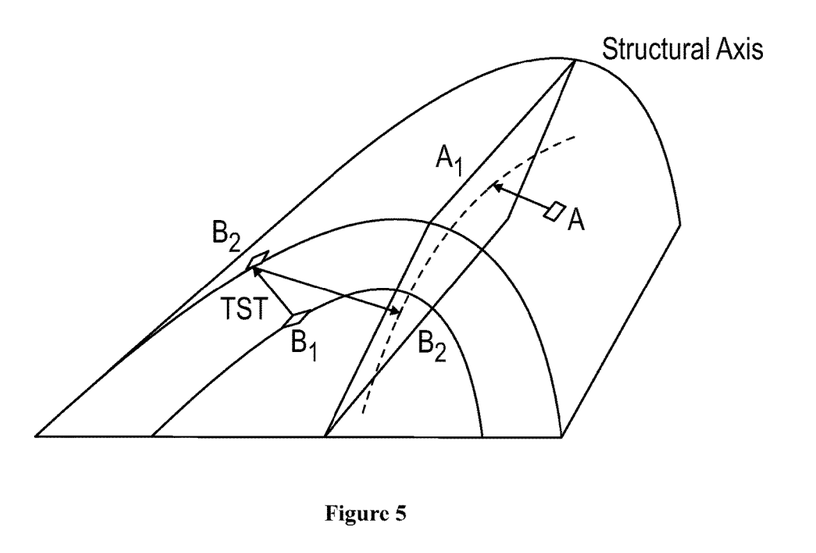
FIG. 5 illustrates an example of computing curvature along a structural axis.
Figure 6:
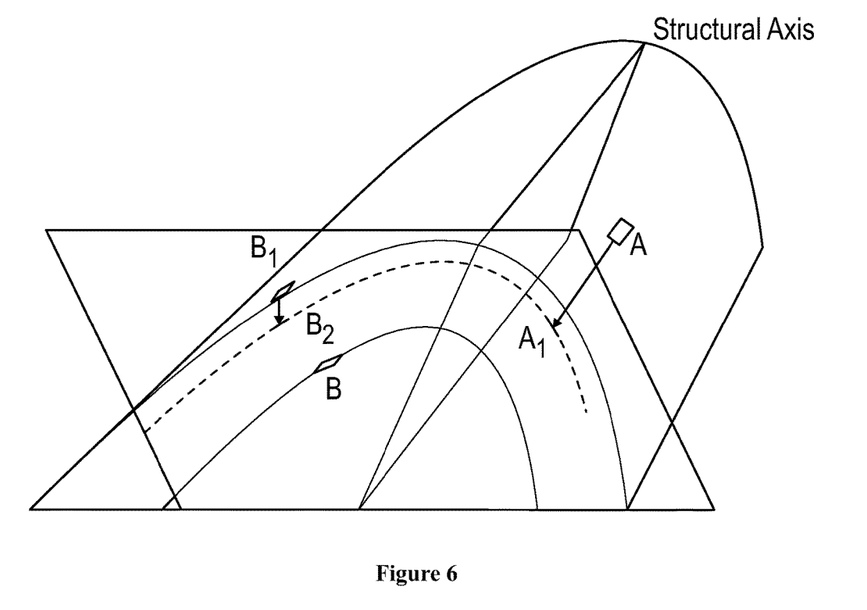
FIG. 6 illustrates an example of computing curvature normal to a structural axis.

Steps one through six generate inputs for embodiments of the curvature analysis process according to this disclosure, which is provide by way of example and illustrated in the workflow diagram of FIG. 4. In the example herein, a curvature property for each dipset (smoothed dips, short zone structural dips, long zone structural dips) is delivered as three curvature logs, representing the curvature of each point along a well on its stratigraphic horizon ("curvature"), curvature along the global minimum curvature direction ("curvature along axis"), and curvature along the global maximum curvature direction ("curvature normal to axis"), respectively. An illustration of an algorithm demonstration of computing curvature along the structural axis is shown in FIG. 5. An illustration of an algorithm demonstration of computing curvature normal to the structural axis is shown in FIG. 6.

The curvature analysis process can be executed after the structural axis delineation process finishes and may involve: 1) computing a local projection, 2) computing a magnitude of curvature, and 3) computing a sign of curvature, each of which is more fully described below. In some embodiments, as an initial step, a constant curvature within intervals between each pair of successive in sequence dips (or local constant dips, or structural dips, depending on which scale the interpreter is interested in) is assigned. Within the specific sequence dip interval, denoted as [A,B], the information used for the curvature analysis is listed below:

$\overrightarrow{axis}$: Structural axis corresponding to this interval.

$\overrightarrow{n_A}$, $\overrightarrow{n_B}$: normal vector of A and B.

$\overrightarrow{AB}$: vector from A to B.

$\Delta TST$: TST difference value between A and B.

1. Local Projection. The nontrivial part of the computation is that while the two dips A and B are quite close to each other, they are not on the same horizon. In the exemplified embodiment, two points A and B are projected to $A_1$ and $B_1$, which now are on the same horizon. In some embodiments, a first step involves calculating the local projection based on an appropriate assumption, which can be the geological parallel fold model principle. This principle is also described in U.S. patent application Ser. Nos. 12/966,716 and 61/334,768. Without loss of generality, we let:

$$\begin{cases} A_1 = A \\ B_1 = B - \overrightarrow{n_B} \cdot \Delta TST \end{cases} \quad (1)$$

2. Magnitude of curvature. By definition, the standard curvature radius is given by the following relationship:

$$\sin(\alpha_i/2) = \frac{D_i/2}{r_i}, i = 1, 2, 3. \quad (2)$$

Where $D_i$ is the distance of the two points, and $\alpha_i$ is the angle between the two normals. Once those two are computed, the curvature can be given as $(\omega_i)(1/r_i)$ with $\omega_i$ representing the sign of curvature. Here i refers to different types of curvature, e.g., i=1 corresponds to 'absolute' or 'direct' curvature, i=2 corresponds to minimum curvature, while i=3 corresponds to maximum curvature.

The computation for the case i=1 may be trivial but as a compact article it may be redundantly stated along with the other two cases. The solution is as follows: denote:)

$\overrightarrow{v} = [0, 0, 1]^T$ as the Z axis, $$\overrightarrow{nv} = \overrightarrow{axis} \times \overrightarrow{v} \quad (3)$$

as the normal of the plane containing $\overrightarrow{axis}$ and $\overrightarrow{v}$.

Then the projection of $B_1$ onto the plane containing $\overrightarrow{axis}$ and $\overrightarrow{v}$ is $$B_2 = B_1 + (\overrightarrow{nv} \cdot \overrightarrow{A - B_1}) \cdot \overrightarrow{nv} \quad (4)$$

And the projection of $B_1$ onto the plane normal to axis is $$B_3 = B_1 + (\overrightarrow{axis} \cdot \overrightarrow{A - B_1}) \cdot \overrightarrow{axis} \quad (5)$$

so now we have $$D_i = \|A - B_i\| \, i = 1, 2, 3. \quad (6)$$

and $$\alpha_i = \min(|\arccos(\overrightarrow{a_i} \cdot \overrightarrow{b_i})|, \pi - |\arccos(\overrightarrow{a_i} \cdot \overrightarrow{b_i})|), i = 1, 2 \quad (7)$$

where for $\overrightarrow{a_i}$, they are the projection of $\overrightarrow{n_A}$ onto corresponding planes, we'll skip the calculation and provide the following direct formula $$\begin{cases} \overrightarrow{a_1} = \dfrac{\overrightarrow{axis} - (n_A + A - B_i \cdot \overrightarrow{v})\overrightarrow{v}}{\|\overrightarrow{axis} - (n_A + A - B_i \cdot \overrightarrow{v})\overrightarrow{v}\|} \\[6pt] \overrightarrow{a_2} = \dfrac{\overrightarrow{axis} - (\overrightarrow{n_A} \cdot \overrightarrow{v})\overrightarrow{v}}{\|\overrightarrow{axis} - (n_A - \overrightarrow{axis} \cdot \overrightarrow{v})\overrightarrow{v}\|} \\[6pt] \overrightarrow{a_3} = \dfrac{\overrightarrow{N_A} - (\overrightarrow{n_A} \cdot \overrightarrow{axis})\overrightarrow{axis}}{\|\overrightarrow{N_A} - (\overrightarrow{n_A} \cdot \overrightarrow{axis})\overrightarrow{axis}\|} \end{cases} \quad (8)$$

for $b_i$ replace index A in the above equation with B.

3. Sign of Curvature. The sign of curvature is useful because positive curvature indicates an antiform structure while negative curvature indicates a synform structure. In some embodiments, to check the sign $\omega_i$ of each of the three curvatures, an approach is to apply the following principle using $\overrightarrow{AB_i}$, $\vec{a_i}$, and $\vec{b_i}$:

$$\omega_i = \begin{cases} -1 & \text{if } \text{Sign}(\overrightarrow{AB_i} \times \vec{b_i}) = \text{Sign}(\vec{a_i} \times \vec{b_i}) \\ 1 & \text{otherwise} \end{cases} \quad (9)$$

For each input of a borehole dip set, the process outputs three curvature logs. Curvatures are systematically computed between successive dips. Hence, processing structural dips at different sampling rates materialize and quantify the different orders of curvatures recorded in the original borehole dip sequence:

The curvature normal to axis is the curvature computed in the direction perpendicular to the structural axis (defined by the structural axis delineation). This direction is the expected direction of maximum curvature.

The curvature along axis is the curvature computed in the direction parallel to the structural axis (defined by the structural axis delineation). This direction is the expected direction of minimum curvature.

The (standard) curvature is the curvature computed in the drilling direction (along well azimuth). This curvature is well trajectory dependent and represents the apparent dip variations of the explored tectonic structure along a vertical cross section containing the well trajectory.

Figure 7:
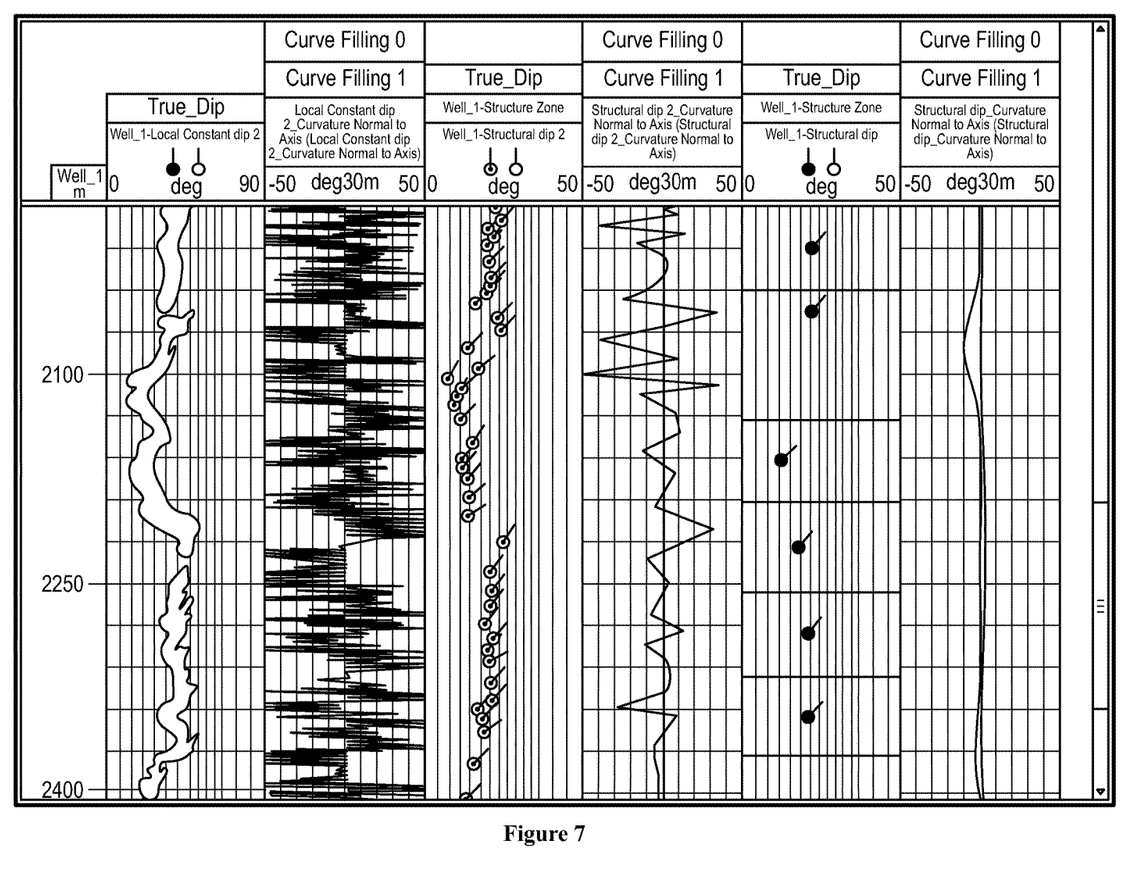
FIG. 7 is a graphical representation of three orders of curvature computed from three different samplings of structural dip in accordance with an embodiment of the present disclosure.

In the example of FIG. 7, positive curvature values (Curve Filing 0, extending toward the right in each of the three graphs) indicate an antiform structure while the negative curvature values (Curve Filing 1, extending toward the left in each of the three graphs) indicate a synform structure.

FIG. 7 is a graphical presentation of the three orders of curvature which have been computed from three different samplings of the structural dip. The curvature logs associated to each input dip set is the curvature normal to the structural axis (maximum curvature).

A number of embodiments have been described. Nevertheless it will be understood that various modifications may be made without departing from the spirit and scope of the invention. Accordingly, other embodiments are included as part of the invention and may be encompassed by the attached claims. Furthermore, the foregoing description of various embodiments does not necessarily imply exclusion. For example, "some" embodiments or "other" embodiments may include all or part of "some", "other" and "further" embodiments within the scope of this invention.

What is claimed is:

1. A method for generating one or more scales of curvature logs, comprising:
   a. pre-processing borehole dips data obtained from one or more borehole images based on at least one downhole measurement in the borehole to generate a true stratigraphic thickness ("TST") index, curvature axis orientation information, and one or more versions of borehole dips; and,
   b. generating a curvature log for dips along a well using the TST, curvature axis orientation information, and one or more upscaled versions of borehole dips, wherein a curvature log includes a magnitude of curvature and a sign of curvature and is computed relative to at least one axis, wherein the curvature relative to the at least one axis is based at least in part on the sign of the curvature and a curvature radius representative of the magnitude of the curvature, wherein the curvature relative to one direction is computed as follows:

$$\frac{\omega_i}{r_i}$$

wherein $\omega_i$ is the sign of the curvature and $r_i$ is the curvature radius representative of the magnitude of the curvature.

2. The method according to claim 1, further comprising: acquiring borehole dips data using one or more downhole tools.

3. The method according to claim 1, further comprising instructing a computer processor to execute instructions resulting in pre-processing the borehole dips data and generating the curvature log.

4. The method according to claim 3, wherein generating the curvature log comprises generating three scales of curvature logs for each pair of dips.

5. The method according to claim 4, wherein the three scales are small, medium and large.

6. The method according to claim 1, wherein generating the curvature log comprises computing a local projection for a pair of dips, computing a magnitude of curvature, computing a sign of curvature.

7. The method according to claim 1, wherein preprocessing data borehole dips to generate a true stratigraphic thickness ("TST") index, curvature axis orientation information, and one or more versions of borehole dips comprises:
   a. performing a standard Dip Sequence Analysis to determine In Sequence Dips, Local Constant Dips and Local Curvature Axis;
   b. using the In Sequence Dips to compute the TST index;
   c. using the Local Constant Dips and the Local Curvature Axis to perform a first Structural Dip Computation using small structural zones resulting in a medium scale structural dip input for estimating a curvature log;
   d. performing a second Structural Dip Computation using longer structural zones as compared to the small structural zones resulting in a large scale structural dip input for generating a curvature log;
   e. using results from the first Structural Dip Computation to perform a Structural Axis Delineation process and computing a structural axis of a dip sequence; and,
   f. performing a second Dip Sequence Analysis to obtain smoothed Local Constant Dips as a small scale input for generating the curvature log.

8. The method according to claim 7, wherein the Structural Axis Delineation, the TST index, and small, medium and large scale inputs are used for generating a curvature log.

9. The method according to claim 7, wherein small structural zones corresponds to zones having a length of 5 m, and larger structural zones correspond to zones having a length of 50 m.

10. The method of claim 1, wherein generating the curvature log includes computing the magnitude and sign of curvature relative to at least three directions.

11. The method of claim 1, comprising generating a curvature normal to axis, a curvature along axis, a standard curvature, wherein:
   a. the curvature normal to axis is a curvature computed in a direction perpendicular to a structural axis,
   b. the curvature along axis is a curvature computed in a direction parallel to the structural axis,
   c. the standard curvature is a curvature computed in a drilling direction.

12. The method of claim 1, comprising taking a downhole measurement in a borehole and generating one or more image of the borehole from the measurement, wherein the borehole dip data is extracted from the one or more borehole image.

13. A system, comprising:
   a. a downhole tool for generating one or more borehole images based on downhole measurements, wherein the borehole image includes borehole dips data; and,
   b. a processor including machine-readable instructions for generating one or more scales of curvature logs from the borehole dips data, wherein the processor is configured to:
      i. pre-process borehole dips data to generate a true stratigraphic thickness ("TST") index, curvature axis orientation information, and one or more versions of borehole dips;
      ii. generate a curvature log for dips along a well using the TST, the curvature axis orientation information, and one or more upscaled versions of borehole dips, wherein the curvature relative to one direction is computed as follows:

$$\frac{\omega_i}{r_i}$$

wherein $\omega_i$ is the sign of the curvature and $r_i$ is the curvature radius representative of the magnitude of the curvature; and
      iii. generating a well stimulation design for the borehole based at least in part on the curvature log.

14. The system according to claim 13, wherein the machine-readable instructions for generating one or more scales of curvature logs comprises machine-readable instructions for pre-processing at least a portion of the borehole dips data to generate a true stratigraphic thickness index, curvature axis orientation information, and one or more versions of borehole dips, and for generating a curvature log for dips along a well using the TST, curvature axis orientation information and the one or more versions of borehole dips.

15. A method for generating a well stimulation design based at least in part on one or more scales of curvature logs, the method comprising:
   a. pre-processing borehole dips data obtained from one or more borehole images based on at least one downhole measurement in the borehole to generate a true stratigraphic thickness ("TST") index, curvature axis orientation information, and one or more versions of borehole dips;
   b. generating a curvature log for dips along a well using the TST, curvature axis orientation information, and one or more upscaled versions of borehole dips, wherein the curvature log includes a magnitude of curvature and a sign of curvature and is computed relative to at least one axis; and
   c. generating a well stimulation design associated with the borehole based at least in part on the curvature log, wherein the curvature relative to one direction is computed as follows:

$$\frac{\omega_i}{r_i}$$

wherein $\omega_i$ is the sign of the curvature and $r_i$ is the curvature radius representative of the magnitude of the curvature.

16. The method of claim 15, wherein generating the curvature log includes computing the magnitude and sign of curvature relative to at least three directions.

17. The method of claim 16, comprising generating a curvature normal to axis, a curvature along axis, a standard curvature, wherein:
   a. the curvature normal to axis is a curvature computed in a direction perpendicular to a structural axis,
   b. the curvature along axis is a curvature computed in a direction parallel to the structural axis,
   c. the standard curvature is a curvature computed in a drilling direction.

* * * * *